(12) United States Patent  
Inoue et al.

(10) Patent No.: US 11,897,484 B2  
(45) Date of Patent: Feb. 13, 2024

(54) VEHICLE OCCUPANT ASSISTANCE APPARATUS

(71) Applicant: TOYOTA JIDOSHA KABUSHIKI KAISHA, Aichi-ken (JP)

(72) Inventors: Teiko Inoue, Toyota (JP); Mitsuyoshi Ohno, Miyoshi (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 84 days.

(21) Appl. No.: 17/356,519

(22) Filed: Jun. 24, 2021

(65) Prior Publication Data

US 2022/0073086 A1    Mar. 10, 2022

(30) Foreign Application Priority Data

Sep. 4, 2020   (JP) .................................. 2020-149219

(51) Int. Cl.
  *B60W 50/00*    (2006.01)
  *B60W 40/06*    (2012.01)
  *B60W 40/10*    (2012.01)

(52) U.S. Cl.
  CPC ........ *B60W 50/0098* (2013.01); *B60W 40/06* (2013.01); *B60W 40/10* (2013.01); *B60W 2540/01* (2020.02); *B60W 2552/35* (2020.02)

(58) Field of Classification Search
  None
  See application file for complete search history.

(56) References Cited

U.S. PATENT DOCUMENTS

| 5,740,041 A    | * | 4/1998  | Iyoda ................. B60R 21/0132 180/282 |
| 2005/0107933 A1 | * | 5/2005  | Kuroda ............... B60R 21/0133 701/45 |
| 2010/0250056 A1 | * | 9/2010  | Perkins .................. B60T 8/175 701/90 |
| 2012/0277965 A1 | * | 11/2012 | Takahashi ........... B60W 30/143 701/70 |
| 2017/0113702 A1 | * | 4/2017  | Thieberger-Navon ...................... B60W 50/0097 |
| 2018/0277091 A1 | * | 9/2018  | Niibe ..................... G10K 15/02 |
| 2019/0054863 A1 | * | 2/2019  | Roth ................... B60R 16/0373 |
| 2019/0225156 A1 |   | 7/2019  | Sasaki et al. |
| 2020/0166373 A1 | * | 5/2020  | Pandey .................... G06N 5/04 |
| 2020/0174486 A1 | * | 6/2020  | Luo ...................... G05D 1/0221 |

(Continued)

FOREIGN PATENT DOCUMENTS

| DE | 102018123092 A1 * | 3/2020 |
| JP | 2015-075999 A     | 4/2015 |
| JP | 2017-076232 A     | 4/2017 |

(Continued)

*Primary Examiner* — Amelia Vorce

(74) *Attorney, Agent, or Firm* — HAUPTMAN HAM, LLP

(57) ABSTRACT

A vehicle occupant assistance apparatus predicts acceleration occurring when a vehicle is traveling. When a make-up mode is activated, assistance information is notified before a predetermined value of the acceleration occurs, based on predicted values of the acceleration. Thus, since the assistance information is notified to an occupant before the vehicle shakes due to the predetermined value of the acceleration, assistance taking a shake of the vehicle into consideration can be rendered to the occupant who applies make-up when the vehicle is traveling.

10 Claims, 11 Drawing Sheets

(56) References Cited

U.S. PATENT DOCUMENTS

2020/0307437 A1* 10/2020 Thieberger .......... B62D 47/006

FOREIGN PATENT DOCUMENTS

| JP | 201948600 A | 3/2019 |
|----|-------------|--------|
| JP | 2019127154 A | 8/2019 |
| JP | 202011594 A | 1/2020 |
| JP | 2020-131882 A | 8/2020 |

* cited by examiner

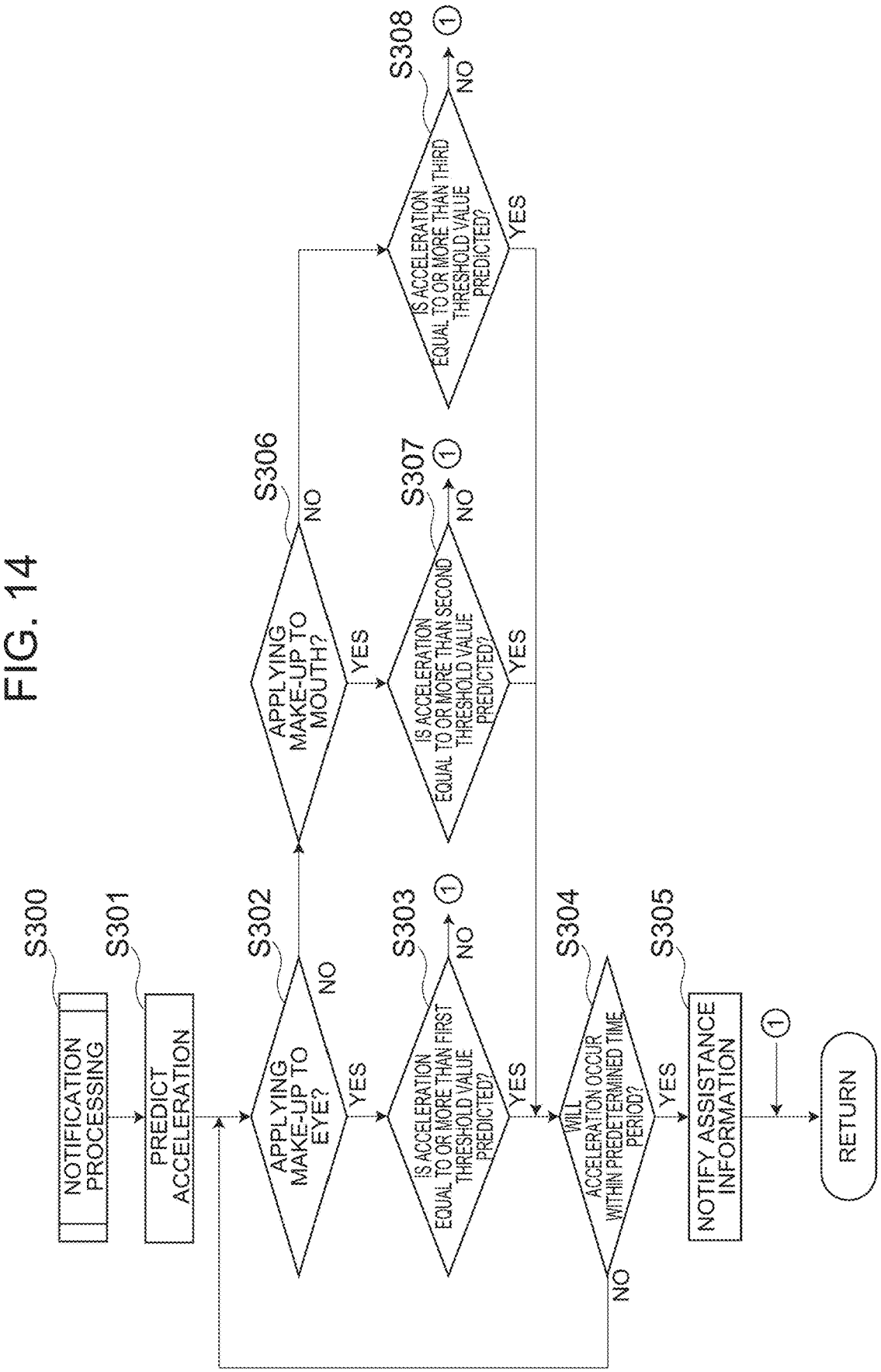

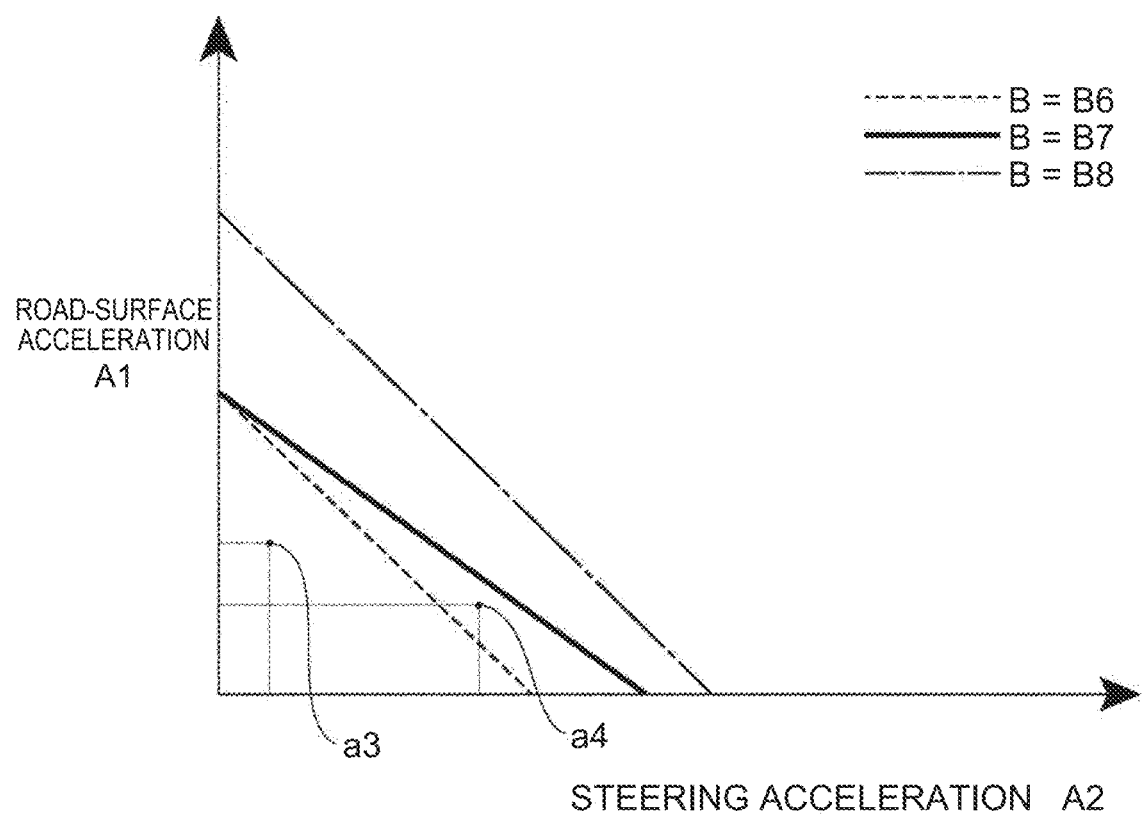

VEHICLE OCCUPANT ASSISTANCE APPARATUS

CROSS-REFERENCE TO RELATED APPLICATION

This application claims priority to Japanese Patent Application No. 2020-149219 filed on Sep. 4, 2020, incorporated herein by reference in its entirety.

BACKGROUND

1. Technical Field

The present disclosure relates to a vehicle occupant assistance apparatus.

2. Description of Related Art

Japanese Patent Application Publication No. 2019-127154 discloses a vehicle that assists an occupant in applying make-up in a vehicle cabin. In the vehicle, when a make-up mode is activated in which an occupant is assisted in applying make-up, voltage is applied to a light control film provided on window glass, and the window glass is made opaque. Thus, the occupant can apply make-up without being seen by passers-by and the like outside of the vehicle.

SUMMARY

Incidentally, a traveling vehicle shakes, due to road roughness, steering and braking of the vehicle, and the like. Accordingly, when make-up is applied in a vehicle cabin of a traveling vehicle, it is preferable to render assistance that takes a shake of the vehicle into consideration, but such a respect is not considered in the technology of JP 2019-127154 A.

The present disclosure has been made in view of such a problem, and an object of the present disclosure is to achieve a vehicle occupant assistance apparatus that can assist an occupant who applies make-up in a vehicle cabin of a traveling vehicle.

A vehicle occupant assistance apparatus according to at least one embodiment includes: an activation section that activates a make-up mode in which an occupant is assisted in applying make-up to the occupant; an acceleration prediction section that predicts acceleration occurring when a vehicle is traveling, based on surroundings information on the vehicle or map information; and a notification section that, in a state where the make-up mode is activated, notifies assistance information for assisting the occupant in applying make-up before a predetermined value of the acceleration occurs, based on predicted values of the acceleration.

According to the vehicle occupant assistance apparatus according to at least one embodiment, the acceleration occurring when the vehicle is traveling is predicted. When the make-up mode is activated, the assistance information is notified before the predetermined value of the acceleration occurs, based on the predicted values of the acceleration. Thus, since the assistance information is notified to the occupant before the vehicle shakes due to the predetermined value of the acceleration, assistance taking a shake of the vehicle into consideration can be rendered to the occupant who applies make-up when the vehicle is traveling.

The vehicle occupant assistance apparatus according to at least one embodiment has the configuration, wherein the predetermined value of the acceleration is the acceleration that is equal to or more than a first threshold value.

According to the vehicle occupant assistance apparatus according to at least one embodiment, a configuration is made such that the assistance information is notified beforehand when the acceleration that is equal to or more than the first threshold value is predicted when the vehicle is traveling. Thus, for example, the occupant can be aware beforehand, from the assistance information, that the vehicle will greatly shake, and therefore can safely apply make-up.

The vehicle occupant assistance apparatus according to at least one embodiment has the configuration, wherein the predetermined value of the acceleration is the acceleration of which a value of integral is equal to or more than a second threshold value, the value of integral being within a predetermined time period for which the acceleration that is equal to or more than the first threshold value continues.

According to the vehicle occupant assistance apparatus according to at least one embodiment, the assistance information is notified when a magnitude of the value of integral within the predetermined time period for which the predetermined value of the acceleration continues is equal to or more than the second threshold value. In other words, a configuration is made such that the value of integral becomes less than the second threshold value, so that the assistance information is not notified when a time period for which the predetermined value of the acceleration continues to occur is so short that make-up of the occupant is not affected. Thus, occasions can be reduced on which the occupant feels annoyed due to more-than-necessary notifications of the assistance information. On the other hand, a configuration is made such that the value of integral becomes equal to or more than the second threshold value, so that the assistance information is notified when the predetermined value of the acceleration continues for such a long time that make-up of the occupant is affected. Thus, the assistance information can be notified to the occupant at an appropriate timing.

The vehicle occupant assistance apparatus according to at least one embodiment has the configuration, wherein: the acceleration prediction section is configured to predict accelerations in a plurality of directions occurring when the vehicle is traveling; and the predetermined value of the acceleration is a synthesized value of accelerations that is equal to or more than a third threshold value, the synthesized value of accelerations being obtained by synthesizing accelerations in two or more directions among the accelerations in the plurality of directions.

Incidentally, when make-up is applied while a vehicle is traveling, accelerations that require caution vary according to a specific type of make-up, in some cases. For example, when lipstick is applied to lips, a shake in an up-down direction can be allowed to some extent, but it is difficult to continue make-up when the vehicle greatly shakes in a right-left direction or a back-forth direction. When mascara is applied to eyelashes, it is difficult to continue make-up when the vehicle shakes in any of the directions. Accordingly, if accelerations occurring to the vehicle are predicted with respect to a plurality of directions and the assistance information is notified based on synthesized values of predicted values of the accelerations, the assistance information to the occupant who applies make-up can be notified more effectively.

Here, according to the vehicle occupant assistance apparatus according to at least one embodiment, the accelerations in the plurality of directions are predicted, and the assistance information is notified when a synthesized value obtained by synthesizing the accelerations in the two or more directions is equal to or more than the third threshold value. Accordingly, the assistance information to the occupant who applies make-up can be notified more effectively.

The vehicle occupant assistance apparatus according to at least one embodiment has the configuration, wherein the accelerations in the two or more directions are accelerations in three axial directions occurring when the vehicle is traveling, the three axial directions being directions along a vehicle-height direction, a vehicle front-rear direction, and a vehicle-width direction.

According to the vehicle occupant assistance apparatus according to at least one embodiment, the effective assistance information can be notified to the occupant who applies make-up, with a shake taken into consideration that is caused, for example, by the acceleration in the vehicle-height direction due to roughness of a road on which the vehicle travels, the acceleration in the vehicle front-rear direction due to braking of the vehicle, the acceleration in the vehicle-width direction due to steering of the vehicle, and the like.

The vehicle occupant assistance apparatus according to at least one embodiment has the configuration further including an identification section that, in a state where the make-up mode is activated, identifies a site to which the occupant applies make-up, wherein the notification section changes the predetermined value of the acceleration, according to the site identified.

According to the vehicle occupant assistance apparatus according to at least one embodiment, the predetermined value of the acceleration that requires prior notification of the assistance information is changed, according to the site to which make-up is applied. Thus, assistance taking a shake of the vehicle into consideration can be rendered, according to the site to which make-up is applied.

The vehicle occupant assistance apparatus according to at least one embodiment has the configuration, wherein when the site to which the occupant applies make-up is identified as an eye or a mouth, the notification section sets the predetermined value of the acceleration to be smaller than when the site to which make-up is applied is identified as another site.

According to the vehicle occupant assistance apparatus according to at least one embodiment, when the occupant is applying make-up to an eye or the mouth, the predetermined value of the acceleration is set to be smaller than when make-up is applied to another site such as a cheek or the forehead. Accordingly, the assistance information can be notified even for a relatively small shake when the occupant is applying make-up to a site more easily affected by a shake of the vehicle, such as an eye or the mouth. Thus, assistance tanking a shake of the vehicle into consideration can be rendered, according to the site to which make-up is applied.

The vehicle occupant assistance apparatus according to at least one embodiment has the configuration, wherein the identification section identifies a make-up tool used by the occupant, based on a video from a camera that shoots an image of the occupant in a vehicle cabin, and identifies the site to which the occupant applies make-up, based on a type of the make-up tool.

According to the vehicle occupant assistance apparatus according to at least one embodiment, the make-up tool used by the occupant can be identified based on the video from the camera. Moreover, according to the vehicle occupant assistance apparatus, the site to which make-up is applied is identified based on the type of the make-up tool. Accordingly, false recognition is prevented in which both an action of simply rubbing an eye and an action of applying mascara to an eye are recognized as identical actions of applying make-up to an eye. Thus, the site to which make-up is applied can be accurately identified, and the appropriate assistance information can be notified.

The vehicle occupant assistance apparatus according to at least one embodiment has the configuration according to, wherein the activation section activates the make-up mode when it is determined, based on a video from a camera that shoots an image of the occupant in a vehicle cabin, that the occupant is applying make-up to the occupant.

According to the vehicle occupant assistance apparatus according to at least one embodiment, it is determined, based on the video from the camera, that the occupant is applying make-up to the occupant, and the make-up mode is activated. In other words, the vehicle occupant assistance apparatus activates the make-up mode and starts assistance, without requesting the occupant to perform an operation. Thus, since the occupant can smoothly start make-up, excellent convenience can be provided.

The vehicle occupant assistance apparatus according to at least one embodiment has the configuration, wherein the activation section activates the make-up mode when a cover part of a mirror part on a sun visor provided in a vehicle cabin is opened.

According to the vehicle occupant assistance apparatus according to at least one embodiment, the make-up mode is activated when the cover part of the mirror part on the sun visor is opened. Accordingly, when the occupant starts applying make-up while looking in the mirror part on the sun visor, the make-up mode is automatically activated. Thus, it can be reliably determined that the occupant is applying make-up in the vehicle cabin.

The vehicle occupant assistance apparatus according to at least one embodiment has the configuration further including: a route and operation plan configuration section that configures a route and operation plan for the vehicle, based on the surroundings information or the map information; and an automatic driving control section that causes the vehicle to travel by automatic driving, based on the route and operation plan, wherein the acceleration prediction section predicts the acceleration occurring when the vehicle is traveling, based on the route and operation plan.

According to the vehicle occupant assistance apparatus according to at least one embodiment, the route and operation plan is configured, and the vehicle is caused to travel by automatic driving, based on the route and operation plan. Moreover, the acceleration occurring to the vehicle is predicted, based on the route and operation plan. Accordingly, even in the vehicle under automatic driving, the occupant in the vehicle cabin can relaxedly apply make-up.

As described above, according to the vehicle occupant assistance apparatus according to at least one embodiment, assistance can be rendered to the occupant who applies make-up in the vehicle cabin of the traveling vehicle.

According to the vehicle occupant assistance apparatus according to at least one embodiment, the occupant can safely apply make-up, by being prepared beforehand for a shake of the vehicle.

According to the vehicle occupant assistance apparatus according to at least one embodiment, the assistance information can be notified at such an appropriate timing that does not cause the occupant to feel annoyed.

According to the vehicle occupant assistance apparatus according to at least one embodiment, the assistance information to the occupant who applies make-up can be notified more effectively.

According to the vehicle occupant assistance apparatus according to at least one embodiment, the assistance information taking a shake of the vehicle into consideration can be notified, based on the predicted values of the accelerations caused by roughness of a road on which the vehicle travels, steering of the vehicle, and braking of the vehicle.

According to the vehicle occupant assistance apparatus according to at least one embodiment, assistance taking a shake of the vehicle into consideration can be rendered, according to the site to which make-up is applied.

According to the vehicle occupant assistance apparatus according to at least one embodiment, the site to which make-up is applied can be accurately identified, and the appropriate assistance information can be notified.

According to the vehicle occupant assistance apparatus according to at least one embodiment, the make-up mode can be activated without requesting the occupant to perform an operation.

According to the vehicle occupant assistance apparatus according to at least one embodiment, it can be reliably determined that the occupant is applying make-up in the vehicle cabin.

According to the vehicle occupant assistance apparatus according to at least one embodiment, even in the vehicle under automatic driving, the occupant in the vehicle cabin can relaxedly apply make-up.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 14 is a flowchart showing an example of a flow of notification processing in the second embodiment; and FIG. 15 is a diagram, corresponding to FIG. 12, for describing a modification example of the present disclosure.

DETAILED DESCRIPTION OF EMBODIMENTS

Figure 1:
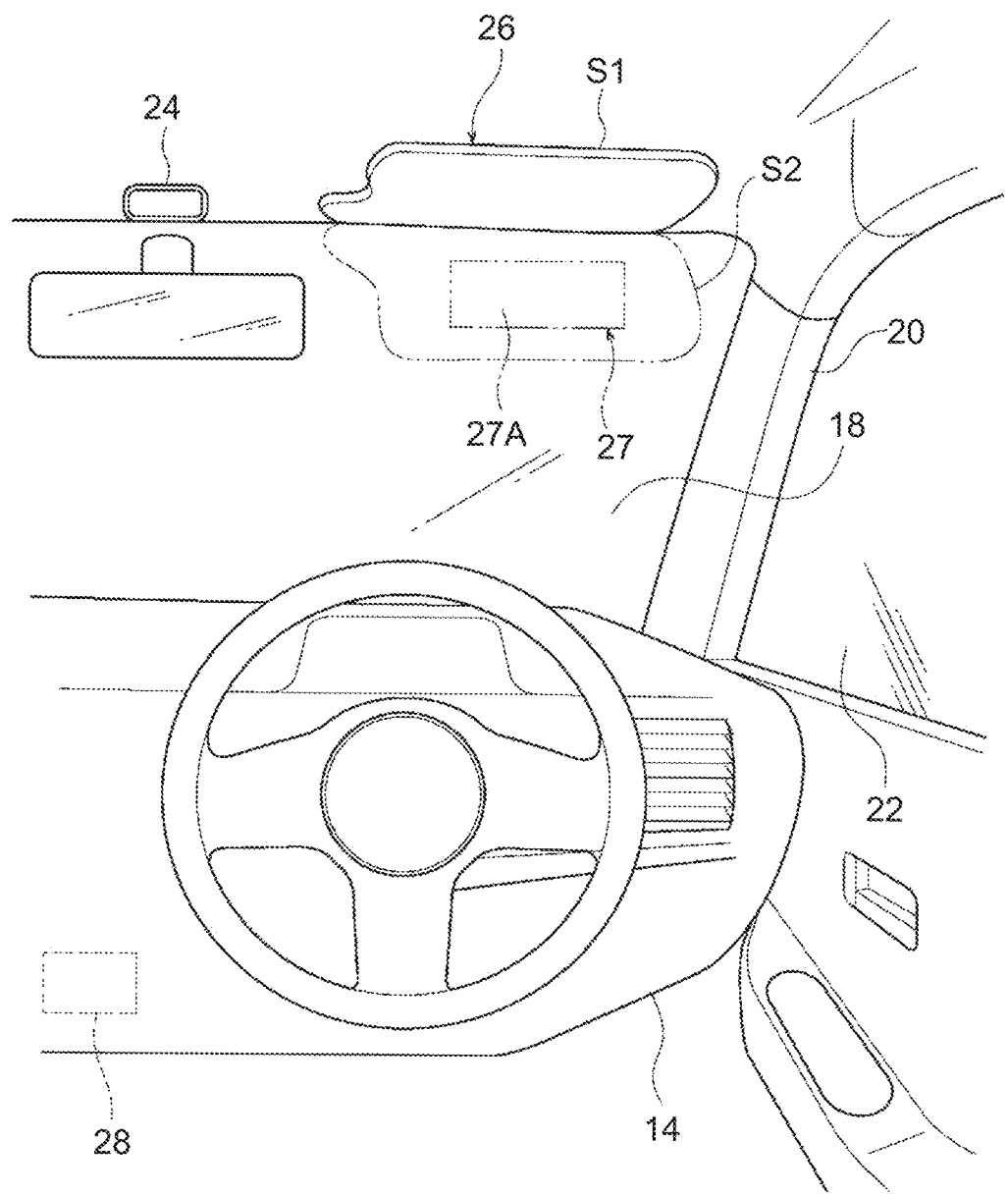
FIG. 1 is a schematic view of a front portion in a vehicle cabin of a vehicle to which a vehicle occupant assistance apparatus according to a first embodiment is applied, viewed from a rear side of the vehicle.

A vehicle 12 to which a vehicle occupant assistance apparatus 10 according to an embodiment is applied will be described with reference to the drawings. Note that the vehicle 12 in the present embodiment is configured, as an example, to be switchable between automatic driving and manual driving. As shown in FIG. 1, an instrument panel 14 is provided at a front portion in a vehicle cabin of the vehicle 12.

The instrument panel 14 extends in a vehicle-width direction, and a steering wheel 16 is provided on the instrument panel 14 on a right side of the vehicle. In other words, as an example, the vehicle is a right-hand drive vehicle with the steering wheel 16 provided on the right side, and a driver seat is configured on the right side of the vehicle, in the present embodiment.

A windshield glass 18 is provided at a front end portion of the instrument panel 14. The windshield glass 18 extends in a vehicle-height direction and the vehicle-width direction and separates an inside of the vehicle cabin from an outside of the vehicle cabin.

An end portion of the windshield glass 18 on the right side of the vehicle is fixed to a front pillar 20 on the right side of the vehicle. The front pillar 20 extends in the vehicle-height direction, and the windshield glass 18 is fixed to an inner-side end portion of front pillar 20 in the vehicle-width direction of the front pillar 20. A front end portion of a front side glass 22 is fixed to an outer-side end portion of the front pillar 20 in the vehicle-width direction of the front pillar 20. Note that an end portion of the windshield glass 18 on a left side of the vehicle is fixed to a front pillar on the left side of the vehicle (not shown).

Here, a camera 24 and a sun visor 26 are provided on a front end portion of a roof (a sign of which is omitted) included in a ceiling of the vehicle cabin. The camera 24 is attached to the roof at a center in the vehicle-width direction of the roof, and is disposed such as to be able to shoot images of occupants sitting in the driver seat and a passenger seat. The cameras 24 may be placed in front of the driver seat and in front of the passenger seat individually.

The sun visor is provided on each of a right side and a left side of the roof in the vehicle-width direction of the roof, and is placed in front of and above each of the driver seat and the passenger seat. The sun visor 26 is formed of an almost rectangular plate member, and one end of the sun visor 26 is pivotally supported by a hinge part fixed to the roof. Thus, the sun visors 26 is configured to be able to change positions between an accommodation position S1, in which the sun visors 26 is placed along the roof, and a use position S2, in which the sun visor 26 comes into a state of being hung from the roof, with the other end of the sun visor 26 lowered.

When the position of the sun visor 26 is changed to the use position S2, a mirror part 27 comes to a position in front of a face of an occupant. An openable and closable cover part is attached to a mirror of the mirror part 27. By opening the cover part 27A of the mirror part 27, the occupant can apply make-up while checking the own face in the mirror of the mirror part 27.

Hardware Configuration of the Vehicle Occupant Assistance Apparatus 10

Figure 2:
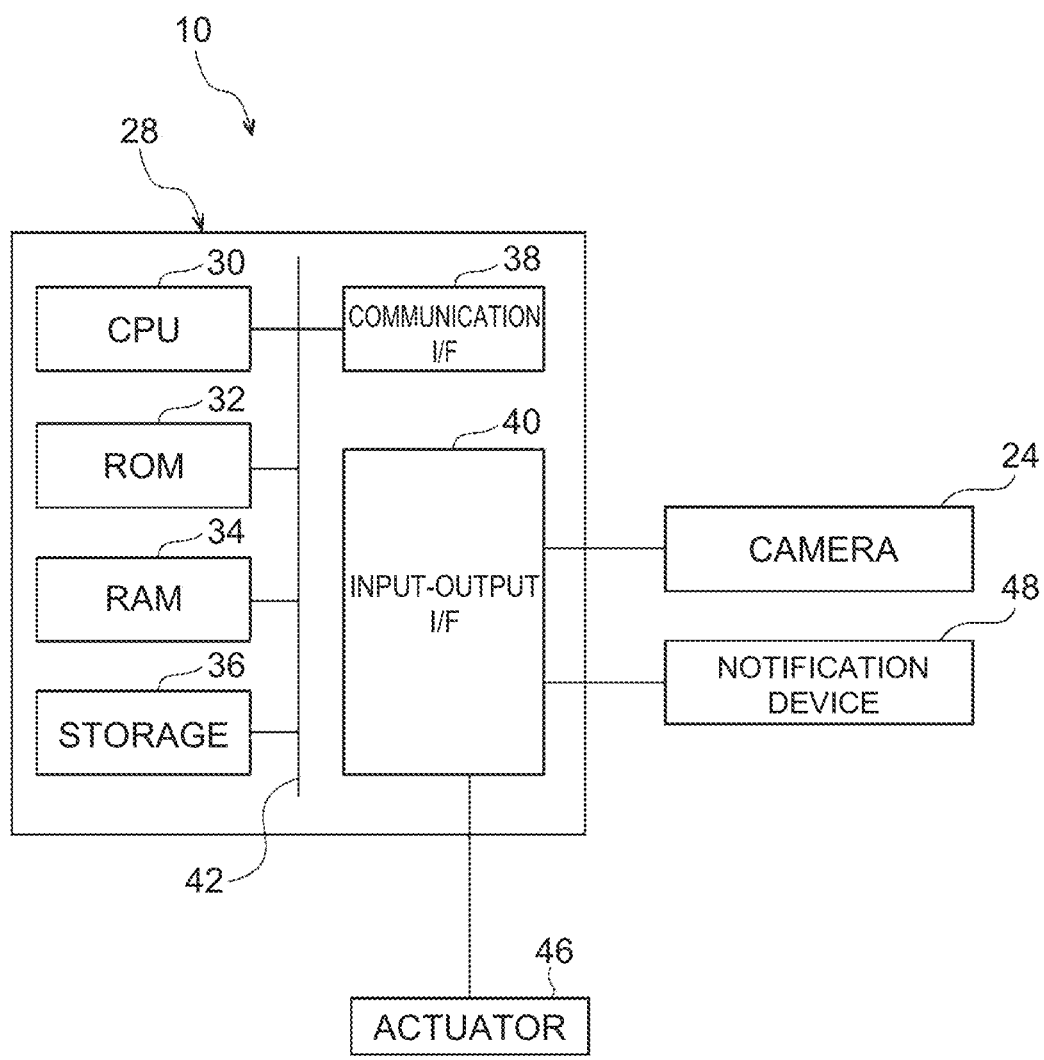
FIG. 2 is a block diagram showing a hardware configuration of the vehicle occupant assistance apparatus according to the first embodiment.

The vehicle 12 is provided with an ECU (Electronic Control Unit) 28 as a control section. FIG. 2 is a block diagram showing a hardware configuration of the vehicle occupant assistance apparatus 10. As shown in FIG. 2, the ECU 28 of the vehicle occupant assistance apparatus 10 includes a CPU (Central Processing Unit: processor) 30, a ROM (Read Only Memory) 32, a RAM (Random Access Memory) 34, a storage 36, a communication interface 38, and an input-output interface 40. The components are connected to each other in a mutually communicable manner through a bus 42.

The CPU 30 is a central processing unit, and executes various programs and controls each section. In other words, the CPU 30 reads a program from the ROM 32 or the storage 36 and executes the program on the RAM 34 as a work area. The CPU 30 performs control of each of the components and various types of computational processing in accordance with the program recorded in the ROM 32 or the storage 36.

The ROM 32 stores the various programs and various data. The RAM 34, as the work area, temporarily store a program or data. The storage 36 is configured by using an HDD (Hard Disk Drive) or an SSD (Solid State Drive) and stores the various programs including an operating system and various data. In the present embodiment, the ROM 32 or the storage 36 stores programs for performing occupant assistance processing and notification processing, various data, and the like.

The communication interface 38 is an interface for allowing the vehicle occupant assistance apparatus 10 to communicate with a server and another device (not shown), and for example, a standard such as Ethernet®, LTE, FDDI, or Wi-Fi® is used.

The camera 24 that shoots images of the occupants in the vehicle cabin, actuators 46, and a notification device 48 are connected to the input-output interface 40. The actuators 46 include a steering actuator, an accelerator actuator, and a brake actuator. The steering actuator is to steer the vehicle 12. The accelerator actuator is to accelerate the vehicle 12. The brake actuator is to decelerate the vehicle 12 by controlling a brake. As an example, the notification device 48 is configured by using a speaker provided in the vehicle cabin, and outputs assistance information through voice data. Irrespective of the speaker, the notification device may be configured by using any of various types of output devices such as a display device and a light in the vehicle cabin. Note that others, such as sensors and a GPS device (not shown) for causing the vehicle 12 to automatically travel and a display device (not shown) provided in the vehicle cabin, are connected to the input-output interface 40.

Functional Configuration of the Vehicle Occupant Assistance Apparatus 10

The vehicle occupant assistance apparatus 10 implements various functions by using the hardware resources. Functional components implemented by the vehicle occupant assistance apparatus 10 will be described with reference to FIG. 3.

Figure 3:
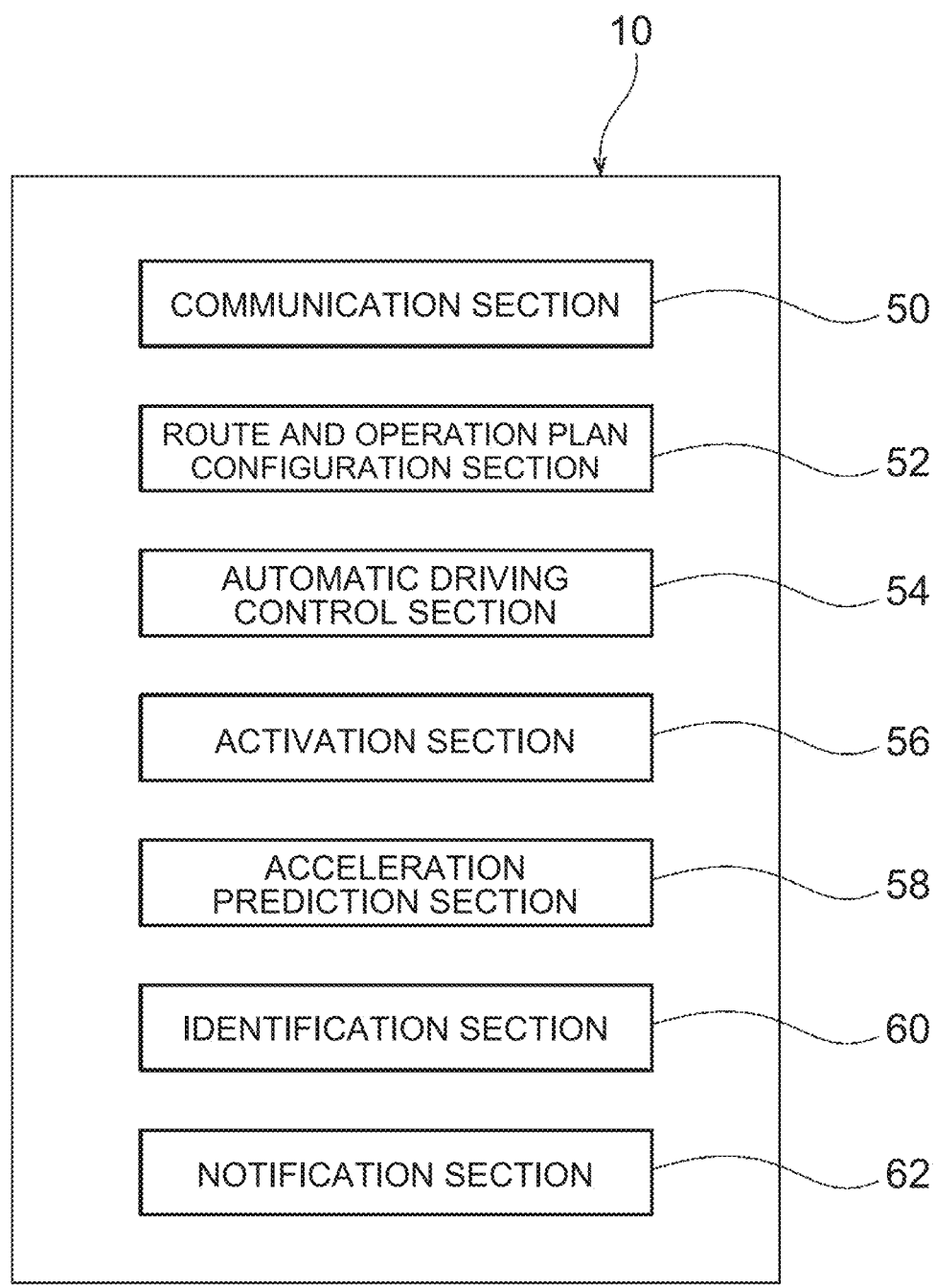
FIG. 3 is a block diagram showing a functional configuration of the vehicle occupant assistance apparatus according to the first embodiment.

As shown in FIG. 3, the vehicle occupant assistance apparatus 10 includes, as functional components, a communication section 50, a route and operation plan configuration section 52, an automatic driving control section 54, an activation section 56, an acceleration prediction section 58, an identification section 60, and a notification section 62. Note that each functional component is implemented by the CPU 30 reading and executing a program stored in the ROM 32 or the storage 36.

The communication section 50 transmits data to and receives data from an external server and another device via the communication interface 38. For example, data such as map information and a traffic situation stored in the server is transmitted and received. The communication section 50 may be configured to perform vehicle-to-vehicle communication with a vehicle around. In the present embodiment, a dynamic map as the map information is received from the external server via the communication interface 38. The dynamic map is high-precision three-dimensional geospatial information (infrastructural map information) with which positions of a road and an own vehicle involved with surroundings of the road can be identified on a lane level, and on which various types of additional map information (for example, traffic control information and the like including dynamic information such as accident and construction information, in addition to static information such as a speed limit) required to support automatic traveling and the like are superposed.

The route and operation plan configuration section 52 configures a route and operation plan for the vehicle 12. Specifically, an occupant inputs a destination, whereby the route and operation plan from a current position to the destination is configured, based on the map information and surroundings information on the vehicle 12. As an example, the "surroundings information" includes information related to a width and a shape of a road on which the vehicle 12 travels, another vehicle traveling in a vicinity of the vehicle 12, an obstacle, and the like. The surroundings information is acquired from an external sensor including a camera that picks up an image in a predetermined range outside of the vehicle 12, a millimeter-wave radar that transmits exploratory waves in the predetermined range, and a LIDAR (Light Detection and Ranging/Laser Imaging Detection and Ranging) that scans the predetermined range.

The automatic driving control section 54 causes the vehicle 12 to travel by automatic driving along the configured route and operation plan, while taking into consideration position information and the surroundings information on the vehicle 12. Specifically, the automatic driving control section 54 causes the vehicle 12 to automatically travel, by controlling the actuators 46.

The activation section 56 activates a make-up mode. In the present embodiment, the make-up mode is activated when it is determined, based on a video of an occupant in the vehicle cabin shot by the camera 24, that the occupant has started make-up. For example, the make-up mode is activated when it is determined, from the video, that the occupant holds a make-up tool. When the make-up mode is activated, the occupant assistance processing and the notification processing are performed, whereby the occupant is assisted in applying make-up to the occupant.

The acceleration prediction section 58 predicts acceleration occurring when the vehicle is traveling, based on the route and operation plan of the vehicle. In the present embodiment, each of accelerations in three axial directions, including road-surface acceleration, braking acceleration, and steering acceleration, is predicted. Functionality of the acceleration prediction section 58 will be described with reference to FIG. 4 and FIG. 5.

Figure 4:
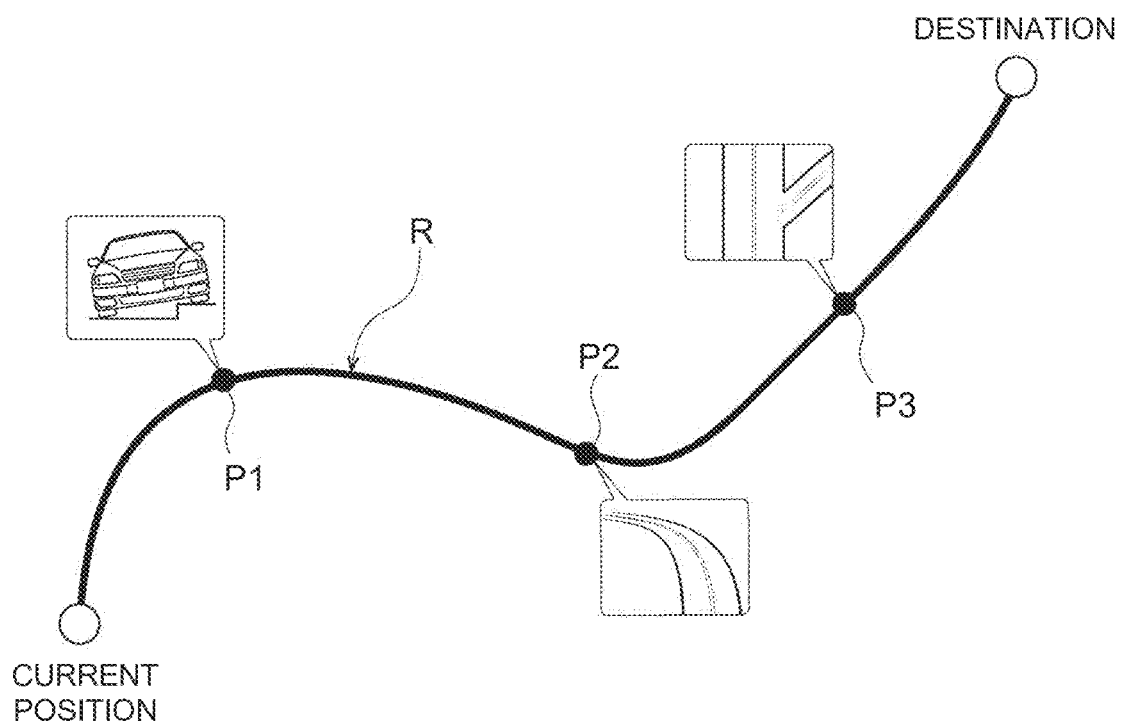
FIG. 4 is a schematic diagram schematically showing a route and operation plan of a vehicle from a current position to a destination.

FIG. 4 is a schematic diagram schematically showing the route and operation plan from the current position to the destination. As shown in FIG. 4, the route and operation plan includes a travel route R from the current position to the destination and various planned operations related to steering and braking of the vehicle 12 to be performed on the travel route R. The acceleration prediction section 58 predicts the accelerations in the three axial directions occurring to the vehicle, based on the map information in the dynamic map and the surroundings information around the current position. In a state where the vehicle 12 is traveling according to the route and operation plan, the accelerations occurring to the vehicle 12 are predicted based on information related to road roughness included in the map information, and on time-course measurement data on the accelerations measured by a vehicle on which an MMS (Mobile Mapping System) measurement system is mounted.

When the vehicle 12 performs an operation that is different from the operations planned in the route and operation plan, the accelerations occurring to the vehicle 12 are predicted based on the surroundings information acquired from the external sensor, with steering and braking of the vehicle, avoidance of collision with an obstacle, and the like taken into consideration.

The road-surface acceleration predicted by the acceleration prediction section 58 is acceleration in the vehicle-height direction caused by roughness of a road on which the vehicle travels. For example, on the travel route R, when the vehicle 12 travels through a point P1 where a road surface is very rough, it is predicted that a value of the road-surface acceleration becomes so large that an occupant in the vehicle cabin may feel a shake in the vehicle-height direction.

The steering acceleration predicted by the acceleration prediction section 58 is acceleration in the vehicle-width direction caused by steering of the vehicle based on steering maneuvers. For example, on the travel route R, when the vehicle travels through a point P2 where the road sharply curves, it is predicted that the steering acceleration becomes so great that the occupant in the vehicle cabin feels a shake in the vehicle-width direction.

The braking acceleration predicted by the acceleration prediction section 58 is acceleration in a vehicle front-rear direction caused by an operation of a brake or an operation of an accelerator of the vehicle. For example, on the travel route R, when the vehicle 12 travels through a point P3 that is a junction of roads, it is predicted that a value of the braking acceleration becomes so large, due to deceleration before the junction, that the occupant in the vehicle cabin feels a shake in the vehicle front-rear direction.

Figure 5:
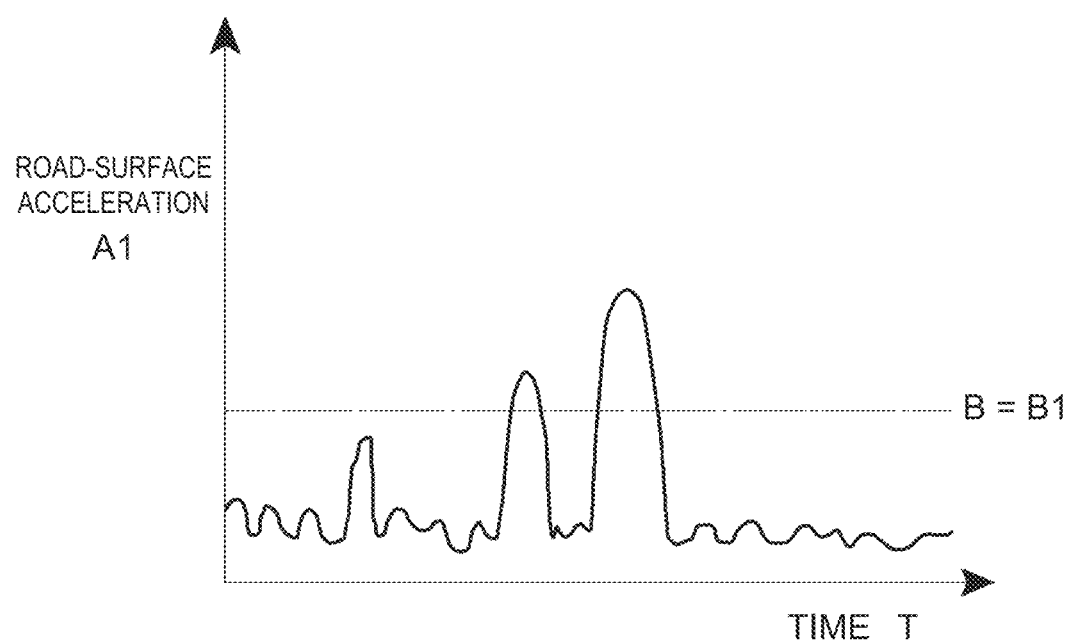
FIG. 5 is an example showing a relationship between an acceleration predicted to occur to the vehicle and time.

FIG. 5 shows predicted values of the road-surface acceleration in a line graph. In the graph, a vertical axis represents the road-surface acceleration A1, and a horizontal axis represents time T. In such a manner, the acceleration prediction section 58 predicts predicted values of acceleration over time, with respect to each of the road-surface acceleration, the steering acceleration, and the braking acceleration.

In a state where the make-up mode is activated, the identification section 60 identifies a site to which an occupant applies make-up, based on a video shot by the camera 24. Specifically, a make-up tool used by the occupant is identified from the video shot by the camera 24, and the site to which the occupant applies make-up is identified based on a type of the identified make-up tool. Functionality of the identification section 60 will be described specifically with reference to FIG. 6 to FIG. 8.

Figure 6:
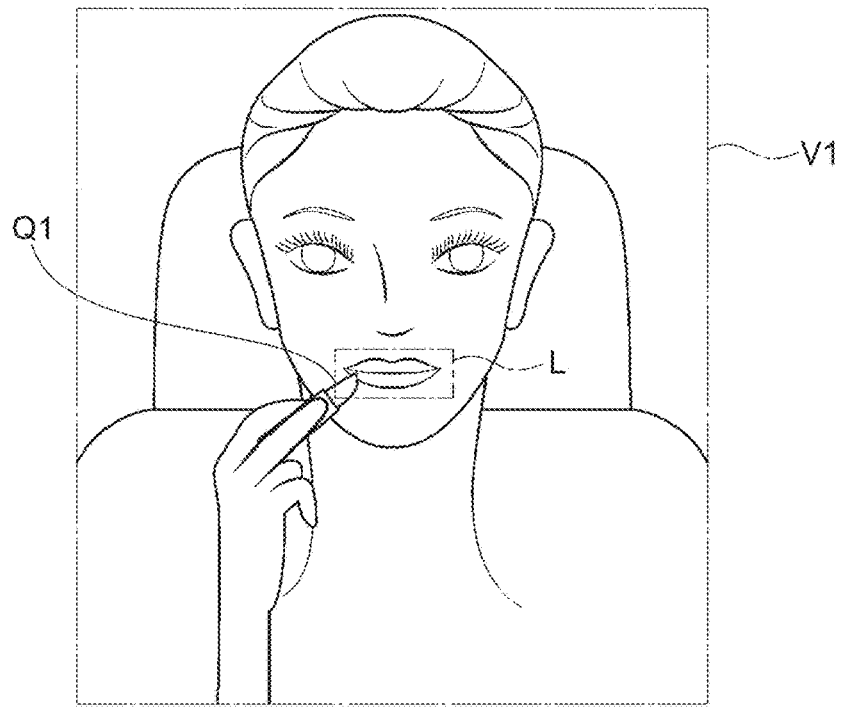
FIG. 6 is an example of a video shot by a camera in the vehicle cabin.
Figure 7:
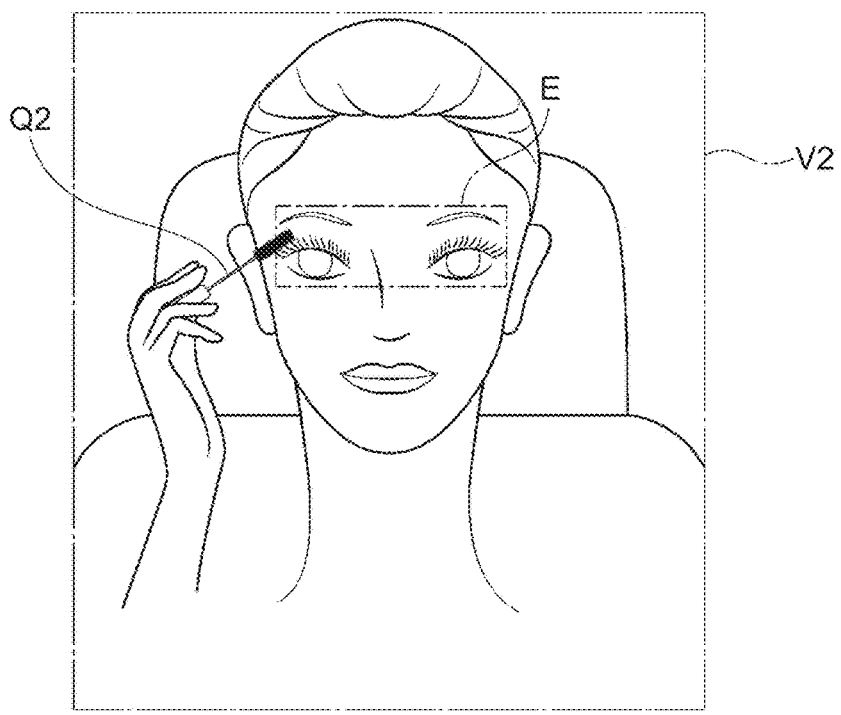
FIG. 7 is an example of a video shot by the camera in the vehicle cabin.
Figure 8:
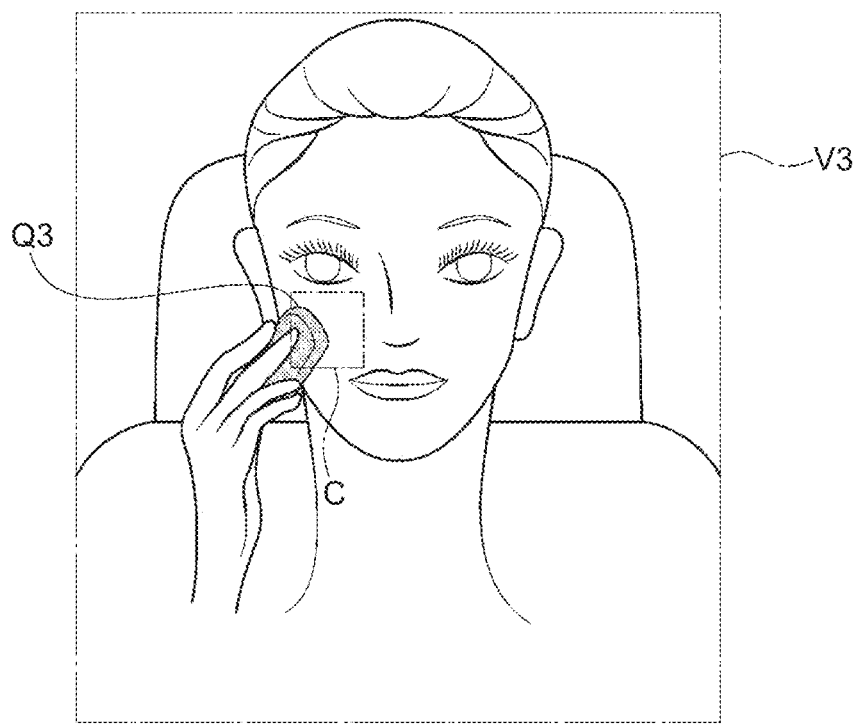
FIG. 8 is an example of a video shot by the camera in the vehicle cabin.

FIG. 6 to FIG. 8 are examples of the video shot by the camera 24. For example, based on a video V1 in FIG. 6, the identification section 60 identifies a make-up tool Q1 used by the occupant as lipstick. Moreover, the identification section 60 recognizes that at least part of the make-up tool Q1 is placed within an area L of the mouth that corresponds with lipstick. Thus, the identification section 60 identifies the site to which the occupant applies make-up as the mouth. Note that the site to which make-up is applied may be identified as the mouth simply when it is determined that the make-up tool Q1 is lipstick. The site to which make-up is applied may be identified as the mouth when it is determined that an area where the lipstick is placed is within a predetermined area in a vicinity of the face.

Similarly, based on a video V2 in FIG. 7, the identification section 60 identifies a make-up tool Q2 used by the occupant as mascara. Moreover, the identification section 60 recognizes that at least part of the make-up tool Q2 is placed within an area E of the eyes that correspond with mascara. Thus, the identification section 60 identifies the site to which the occupant applies make-up as an eye.

Similarly, based on a video V3 in FIG. 8, the identification section 60 identifies a make-up tool Q3 used by the occupant as sponge. Moreover, the identification section 60 recognizes that at least part of the make-up tool Q3 is placed within an area C of a cheek that corresponds with sponge. Thus, the identification section 60 identifies the site to which the occupant applies make-up as a cheek.

The notification section 62 notifies assistance information for assisting the occupant in applying make-up before a predetermined value of acceleration occurs, based on the predicted values of acceleration predicted by the acceleration prediction section. In the present embodiment, as an example, it is assumed that the road-surface acceleration that is equal to or more than a threshold value B=B1 is the "predetermined value of acceleration" (see FIG. 5). The notification section 62 notifies the assistance information before the road-surface acceleration that is equal to or more than the threshold value B1 occurs, based on the predicted values from the acceleration prediction section 58. Specifically, audio data as the assistance information is output from the notification device 48 provided in the vehicle cabin. As an example, the assistance information in the present embodiment is assumed to be an alarm tone. Since the occupant, by hearing the alarm tone, can be aware beforehand that the vehicle will shake soon, the occupant can be prepared for a shake by determining suspension of make-up or the like. The threshold value B=B1 corresponds to a "first threshold value" in the present disclosure.

Effects

Next, effects of the present embodiment will be described.
Make-Up Assistance Processing An example of the make-up assistance processing of assisting, based on a route and operation plan, an occupant in applying make-up to the occupant will be described by using a flowchart shown in FIG. 9. The make-up assistance processing is performed by the CPU 30 reading a display program from the ROM 32 or the storage 36, and decompressing and executing the display program on the RAM 34.

Figure 9:
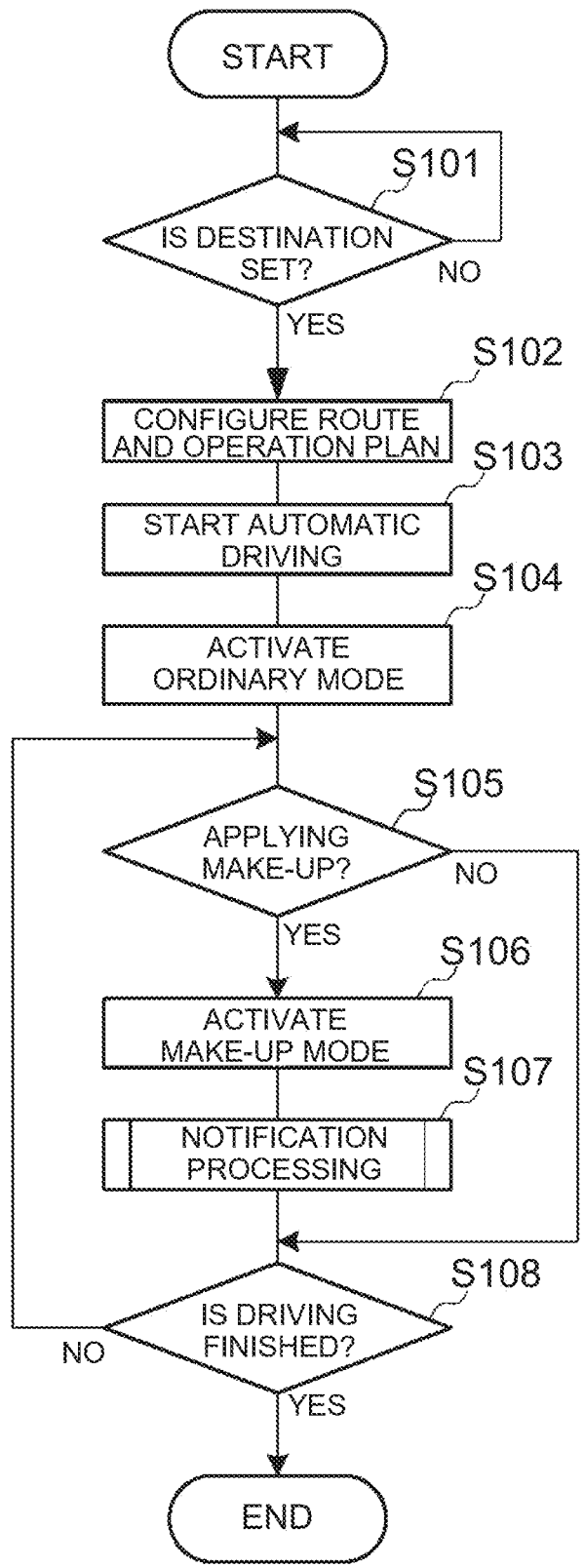
FIG. 9 is a flowchart showing an example of a flow of make-up assistance processing in the first embodiment.

As shown in FIG. 9, in step S101, the CPU 30 determines whether or not a destination is set. The destination may be directly input to the vehicle 12, or may be indirectly input via a mobile terminal or the like, by the occupant.

When it is determined in step S101 that a destination is set, the CPU 30 moves to processing in step S102. When it is determined in step S101 that a destination is not set, the CPU 30 repeats the processing in step S101.

In step S102, the CPU 30 configures a route and operation plan for the vehicle 12. Specifically, by using functionality of the route and operation plan configuration section 52, the CPU 30 configures the route and operation plan from a current position to the destination.

In step S103, the CPU 30 starts automatic driving. Specifically, by using functionality of the automatic driving control section, the CPU 30 causes the vehicle 12 to automatically travel based on the route and operation plan.

In step S104, the CPU 30 activates an ordinary mode. In the ordinary mode, for example, when occurrence of acceleration that can cause the occupant to lose posture is predicted based on the route and operation plan, the occupant is alerted to take caution. As an example, in the ordinary mode, a threshold value that is larger than the threshold value (B=B1) of acceleration in the make-up mode is set, and caution information is notified to the occupant when acceleration that is equal to or more than the set threshold value is predicted. Notification of the caution information is performed, for example, by outputting an alarm tone from the notification device 48.

In step S105, the CPU 30 determines whether or not the occupant is applying make-up. Specifically, by using functionality of the activation section 56, the CPU 30 determines, based on a video shot by the camera 24, whether or not the occupant is holding a make-up tool.

When it is determined in step S105 that the occupant is applying make-up, the CPU 30 moves to processing in step S106. When it is determined in step S105 that the occupant is not applying make-up, the CPU 30 moves to processing in step S108.

In step S106, the CPU 30 activates the make-up mode, and moves to processing in step S107. After the CPU 30 performs the notification processing of causing the notification device 48 to notify the assistance information in step S107, the CPU 30 moves to the processing in step S108.

In step S108, the CPU 30 determines whether or not the automatic driving of the vehicle 12 is finished. When it is determined in step S108 that the automatic driving is finished, the CPU 30 terminates the make-up assistance processing. When it is determined in step S108 that the automatic driving is not finished, the CPU 30 returns to step S105 and repeats the processing.

Notification Processing

Next, an example of the notification processing of causing the notification device 48 to notify the assistance information will be described by using a flowchart in FIG. 10. The notification processing is performed by the CPU 30 reading a display program from the ROM 32 or the storage 36, and decompressing and executing the display program on the RAM 34.

Figure 10:
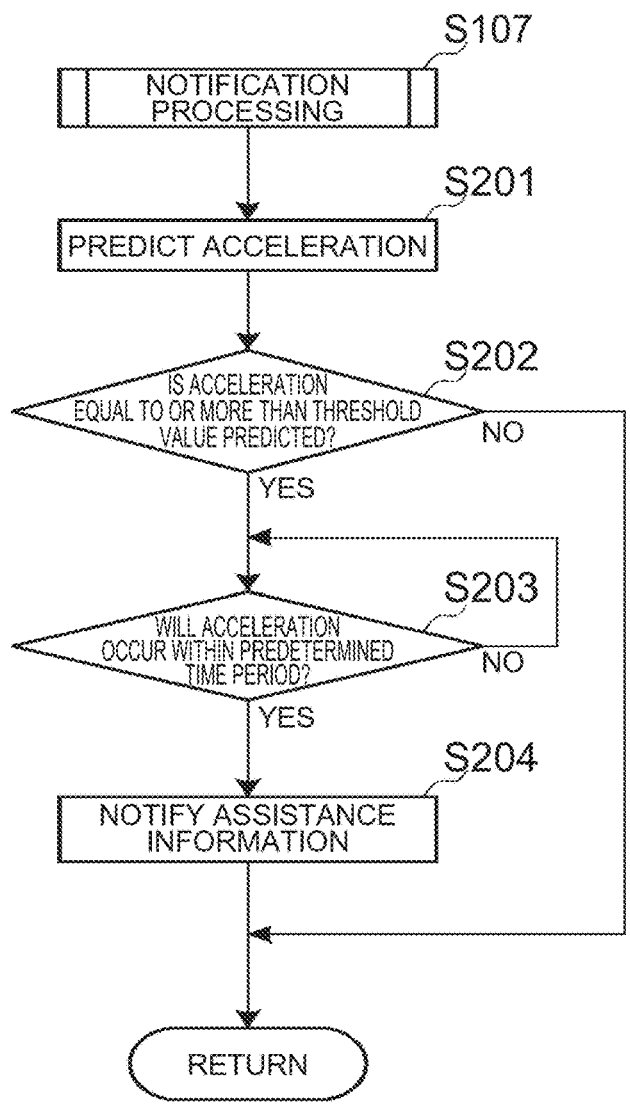
FIG. 10 is a flowchart showing an example of a flow of notification processing in the first embodiment.

As shown in FIG. 10, the CPU 30 predicts acceleration in step S201. Specifically, by using the functionality of the acceleration prediction section 58, the CPU 30 predicts the road-surface acceleration occurring to the vehicle 12.

In step S202, the CPU 30 determines whether or not predicted values of the acceleration include a value of the acceleration that is equal to or more than the predetermined threshold value. Specifically, by using functionality of the notification section 62, the CPU 30 determines whether or not the road-surface acceleration that is equal to or more than the threshold value B=B1 is predicted.

When it is determined in step S202 that a value of the acceleration that is equal to or more than the predetermined threshold value is included, the CPU 30 moves to processing in step S203. When it is determined in step S202 that a value of the acceleration that is equal to or more than the predetermined threshold value is not included, the CPU 30 terminates the processing.

In step S203, the CPU 30 determines whether or not the acceleration that is equal to or more than the threshold value will occur within a predetermined time period. Specifically, taking position information, vehicle speed, and the like of the vehicle 12 into consideration, the CPU 30 determines whether or not a time period required for the vehicle to arrive at a target point where occurrence of the acceleration that is equal to or more than the threshold value is predicted is less than the predetermined time period. The predetermined time period can be set as appropriate, but is assumed to be several seconds or so, as an example. A configuration may be made such that the predetermined time period is set according to a request of the occupant.

When it is determined in step S203 that the acceleration that is equal to or more than the threshold value will occur within the predetermined time period, the CPU 30 moves to processing in step S204. When it is determined in step S203 that the acceleration that is equal to or more than the threshold value will not occur within the predetermined time period, the CPU 30 returns to step S203 and repeats the processing.

In step S204, the CPU 30 causes the notification device 48 to notify the assistance information. Specifically, by using the functionality of the notification section 62, the CPU 30 outputs the alarm tone from the notification device 48 including the speaker in the vehicle cabin. After the processing in step S204 is finished, the CPU 30 terminates the notification processing.

As described above, according to the vehicle occupant assistance apparatus 10, acceleration occurring when the vehicle 12 is traveling is predicted. In a state where the make-up mode is activated, the assistance information is notified before the predetermined value of the acceleration occurs, based on the predicted values of the acceleration. Thus, the occupant is notified of the assistance information before the vehicle shakes due to the predetermined value of the acceleration. As a result, assistance taking a shake of the vehicle into consideration can be rendered to the occupant who applies make-up when the vehicle 12 is traveling.

Specifically, as shown in FIG. 5, a configuration is made such that the assistance information is notified when it is predicted that the road-surface acceleration in the vehicle-height direction becomes equal to or more than the threshold value B=B1 when the vehicle 12 is traveling. Thus, from the assistance information, the occupant can be aware beforehand that the vehicle will greatly shake in the up-down direction, and therefore can safely apply make-up.

In the present embodiment, it is determined, based on a video from the camera 24 that shoots an image of the occupant in the vehicle cabin, that the occupant is applying make-up to the occupant, and the make-up mode is activated. In other words, the vehicle occupant assistance apparatus 10 can activate the make-up mode without requesting the occupant to perform an operation, and can start assistance. Thus, since the occupant can smoothly start make-up, excellent convenience can be provided.

In the vehicle occupant assistance apparatus 10 according to the present embodiment, a route and operation plan from a current position to a destination is configured, and the vehicle 12 is caused to travel by automatic driving, based on the route and operation plan. Further, acceleration occurring to the vehicle 12 is predicted based on the route and operation plan of the vehicle 12, and the assistance information is notified. Accordingly, even in the vehicle under automatic driving, the occupant in the vehicle cabin can relaxedly apply make-up.

In the first embodiment, a configuration is made such that the assistance information is notified when it is predicted that acceleration that is equal to or more than the threshold value B=B1 will occur, with respect to the road-surface acceleration in the vehicle-height direction. However, the present disclosure is not limited to such a configuration. For example, a configuration may be made such that the assistance information is notified when it is predicted that acceleration that is equal to or more than the threshold value B=B1 will occur, with respect to the braking acceleration in the vehicle front-rear direction or the steering acceleration in the vehicle-width direction. Alternatively, a configuration may be made such that the assistance information is notified when it is predicted that acceleration that is equal to or more than the threshold value B=B1 will occur, with respect to an acceleration in at least one direction of the three axial directions. Alternatively, the assistance information may be notified by using a threshold value of acceleration illustrated in a modification example 1 or a modification example 2, which will be described below.

Modification Example 1

Figure 11:
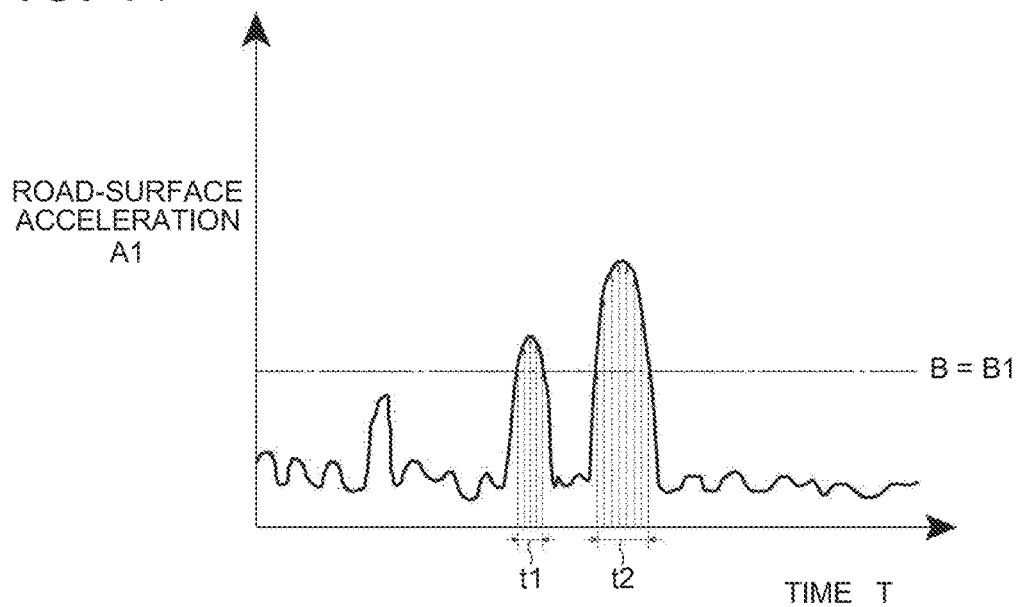
FIG. 11 is a diagram, corresponding to FIG. 5, for describing a modification example of the present disclosure.

As shown in FIG. 11, the modification example 1 is characterized in that a threshold value is set with respect to a magnitude of a value of integral within a predetermined time period for which a predetermined value of acceleration continues. The assistance information is notified when the magnitude of the value of integral is equal to or more than a predetermined threshold value. In the present modification example, as an example, the value of integral is calculated with respect to acceleration that is equal to or more than the threshold value B=B1 similar to the acceleration in the first embodiment. In other words, when the acceleration that is equal to or more than the threshold value B=B1 is predicted, and when the value of integral within the predetermined time period t for which such acceleration continues is equal to or more than the predetermined threshold value (not shown), the assistance information is notified as in the first embodiment. Note that the "predetermined threshold value" set with respect to the value of integral of acceleration corresponds to a "second threshold value" in the present disclosure.

Specifically, the acceleration that is equal to or more than the threshold value B=B1 is detected from predicted values of the road-surface acceleration by using the functionality of the notification section 62, and when the acceleration that is equal to or more than the threshold value B=B1 is predicted, the predetermined time period t for which such acceleration continues is calculated. The assistance information is notified when the value of integral of the acceleration within the predetermined time period t is equal to or more than the predetermined threshold value.

As an example, FIG. 11 shows predicted values of the road-surface acceleration A1 that change over time, in a line graph. According to the predicted values, the acceleration that is equal to or more than the threshold value B=B1 occurs twice with respect to the road-surface acceleration A1. The predetermined time periods t for which the acceleration that is equal to or more than the threshold value B=B1 continues are denoted by t1 and t2, respectively. With respect to each of the predetermined time periods t1 and t2, the notification section 62 calculates the value of integral of the road-surface acceleration A1, and determines whether or not to notify the assistance information, depending on whether or not the value of integral is equal to or more than the predetermined threshold value.

According to the configuration described above, a configuration is made such that the value of integral becomes less than the predetermined threshold value, so that the assistance information is not notified when a time period for which the acceleration that is equal to or more than the threshold value B=B1 (first threshold value) continues to occur is so short that make-up of the occupant is not affected. Thus, occasions can be reduced on which the occupant feels annoyed due to more-than-necessary notifications of the assistance information. On the other hand, a configuration is made such that the value of integral becomes equal to or more than the second threshold value, so that the assistance information is notified when the acceleration that is equal to or more than the threshold value B=B1 continues for such a long time that make-up of the occupant is affected. Thus, a shake of the vehicle that may affect the occupant who is applying make-up can be accurately predicted, and the assistance information can be notified to the occupant.

Modification Example 2

Figure 12:
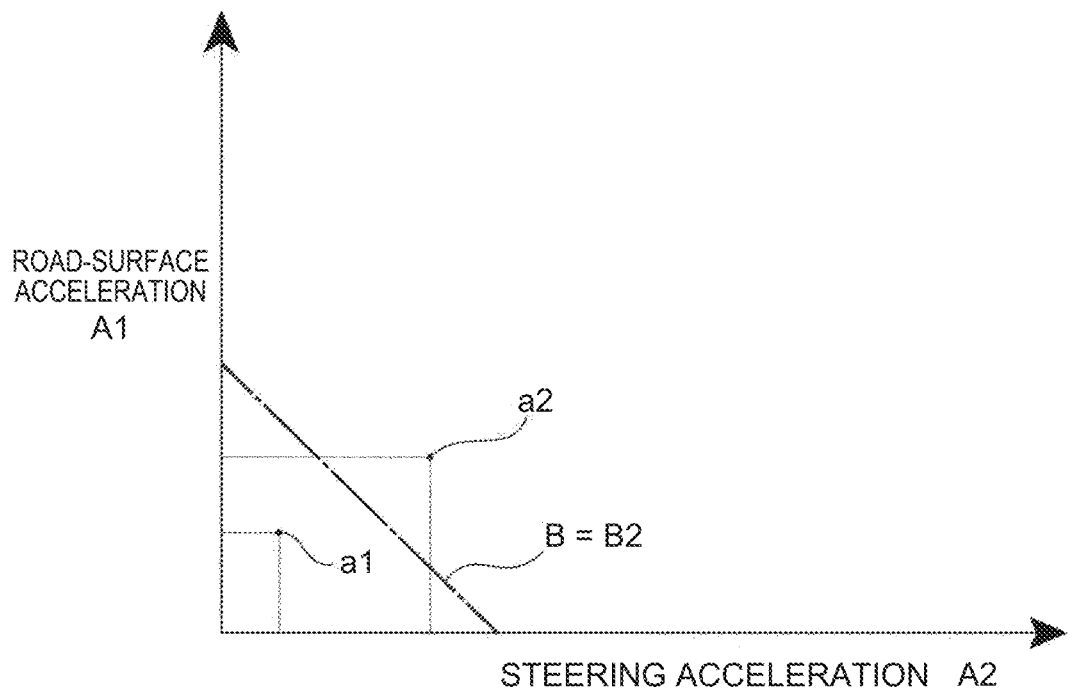
FIG. 12 is a diagram for describing a modification example of the present disclosure, and shows relationships between synthesized values of accelerations in a plurality of directions and a threshold value.

As shown in FIG. 12, the modification example 2 is characterized in that a synthesized value obtained by synthesizing accelerations in two or more directions is used for a predetermined value of acceleration, and a threshold value is set with respect to a magnitude of such a predetermined value of acceleration. In other words, in the first embodiment, acceleration occurring to the vehicle 12 is predicted with respect to the accelerations in the three axial directions, namely, the road-surface acceleration in the vehicle-height direction, the braking acceleration in the vehicle front-rear direction, and the steering acceleration in the vehicle-width direction. In the modification example 2, when a synthesized value of accelerations in two or more directions of the three axial directions is equal to or more than a predetermined threshold value, the assistance information is notified as in the first embodiment.

In the modification example 2 shown in FIG. 12, as an example, the assistance information is notified when a synthesized value of the road-surface acceleration in the vehicle-height direction and the steering acceleration in the vehicle-width direction is equal to or more than the threshold value B=B2. Accordingly, the threshold value B=B2 corresponds to a "third threshold value" in the present disclosure.

FIG. 12 shows a scatter diagram with a vertical axis representing the road-surface acceleration A1 and a horizontal axis representing the steering acceleration A2, on which synthesized values of the accelerations in the two directions are mapped. Referring to FIG. 12, it can be seen that a synthesized value a1 is less than the threshold value B=B2. Moreover, it can be seen that a synthesized value a2 is equal to or more than the threshold value B=B2. Accordingly, the notification section 62 notifies the assistance information before synthesized acceleration corresponding to the synthesized value a2 occurs.

Note that the described example in which the assistance information is notified based on the synthesized values of accelerations in biaxial directions that are the road-surface acceleration and the steering acceleration is only an example. Accelerations in any biaxial directions, or the three axial directions, can be selected as appropriate from the road-surface acceleration, the braking acceleration, and the steering acceleration, and the assistance information can be notified based on the synthesized values of the selected accelerations.

According to the configuration described above, any of the accelerations in the vehicle-height direction, the vehicle front-rear direction, and the vehicle-width direction can be combined as necessary, and a threshold value can be set with respect to the synthesized values of the combined accelerations.

Incidentally, when make-up is applied while a vehicle is traveling, accelerations that require caution vary according to a specific type of make-up, in some cases. For example, when lipstick is applied to lips, a shake in the up-down direction can be allowed to some extent, but it is difficult to continue make-up when the vehicle greatly shakes in the right-left direction or the back-forth direction. When mascara is applied to eyelashes, it is difficult to continue make-up when the vehicle shakes in any of the directions. Accordingly, if accelerations occurring to the vehicle are predicted with respect to a plurality of directions and the assistance information is notified based on the synthesized values of predicted values of the accelerations, the assistance information to the occupant who is applying make-up can be notified more effectively.

Accordingly, in the modification example 2, accelerations in a plurality of directions predicted to occur to the vehicle 12 can be combined according to a necessity, and a threshold value can be set with respect to the synthesized values of the combined accelerations. Thus, the assistance information to the occupant who is applying make-up can be notified more effectively.

Moreover, in the present modification example, any of the accelerations predicted with respect to the three axial directions along the vehicle-height direction, the vehicle front-rear direction, and the vehicle-width direction are synthesized according to a necessity, and the assistance information is notified based on the synthesized values. Accordingly, the effective assistance information can be notified to the occupant who is applying make-up, with a shake taken into consideration that is caused by the acceleration in the vehicle-height direction due to roughness of a road on which the vehicle travels, the acceleration in the vehicle front-rear direction due to braking of the vehicle, the acceleration in the vehicle-width direction due to steering of the vehicle, and the like.

Modification Example 3

In the embodiment, to activate the make-up mode by using the functionality of the activation section 56, a configuration is made such that it is determined, based on a video shot by the camera 24, whether or not the occupant starts make-up. However, a configuration may be made such that the make-up mode is activated, based on whether the mirror part 27 on the sun visor 26 is opened or closed, as in a modification example 3, which will be described below.

Specifically, a mirror sensor (not shown) that senses opening and closing of the cover part 27A of the mirror part 27 is connected to the input-output interface 40 included in the hardware according to the first embodiment. The activation section 56 activates the make-up mode when detecting, based on a signal from the mirror sensor, that the cover part 27A is opened.

According to such a configuration, the make-up mode is activated when the cover part of the mirror part on the sun visor is opened. Accordingly, when the occupant starts applying make-up while looking in the mirror part on the sun visor, the make-up mode is automatically activated. Thus, it can be reliably determined that the occupant is applying make-up in the vehicle cabin.

Second Embodiment

Hereinafter, a second embodiment of the present disclosure will be described with reference to FIG. 13 to FIG. 15. Note that the same constituent components as in the first embodiment are denoted by the same signs as in the first embodiment, and a description thereof will be omitted.

Figure 13:
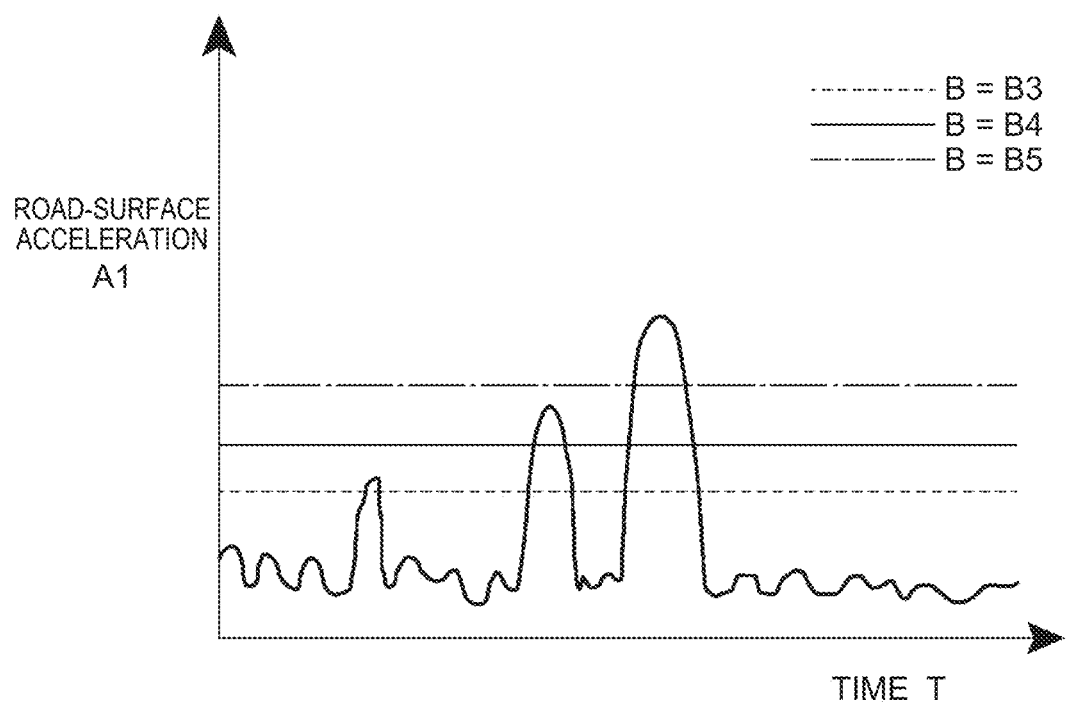
FIG. 13 is a diagram, corresponding to FIG. 5, for describing a vehicle occupant assistance apparatus according to a second embodiment.

FIG. 13 shows, as an example, predicted values of the road-surface acceleration that change over time, in a line graph with a vertical axis representing the road-surface acceleration A1 and a horizontal axis representing time T. In the first embodiment, the threshold value B=B1 is set with respect to the road-surface acceleration, and the assistance information is notified when the acceleration that is equal to or more than the threshold value is predicted. By contrast, the second embodiment is characterized in that the threshold value is changed, depending on a site to which an occupant applies make-up. The other configuration is the same as in the first embodiment.

In the present embodiment, an example of notification processing of outputting the assistance information to the notification device 48 will be described by using a flowchart shown in FIG. 14. The notification processing is performed by the CPU 30 reading a display program from the ROM 32 or the storage 36, and decompressing and executing the display program on the RAM 34. Note that steps of the notification processing shown at steps S300 to S308 in FIG. 14 are included as part in the make-up assistance processing shown in FIG. 9, similarly to the notification processing in the first embodiment.

As shown in FIG. 14, the CPU 30 predicts acceleration in step S301. Specifically, by using the functionality of the acceleration prediction section 58, the CPU 30 predicts the road-surface acceleration occurring to the vehicle 12.

In step S302, the CPU 30 determines whether or not an occupant is applying make-up to an eye. Specifically, by using the functionality of the identification section 60, the CPU 30 performs the determination, based on a video shot by the camera 24.

When it is determined in step S302 that the occupant is applying make-up to an eye, the CPU 30 moves to processing in step S303. When it is determined in step S302 that the occupant is not applying make-up to an eye, the CPU 30 moves to processing in step S306.

In step S303, the CPU 30 determines whether or not the acceleration that is equal to or more than a first threshold value is predicted. Specifically, as shown in FIG. 13, the CPU 30 determines whether or not the acceleration that is equal to or more than the threshold value B=B3 is predicted with respect to the road-surface acceleration.

When it is determined in step S303 that the acceleration that is equal to or more than the first threshold value is predicted, the CPU 30 moves to processing in step S304. When it is determined in step S303 that the acceleration that is equal to or more than the first threshold value is not predicted, the CPU 30 terminates the processing.

A description of processing in steps S304 to S305 will be omitted because the processing is similar to the processing in steps S203 to S204 in FIG. 10.

When the CPU 30 determines in step S302 that the occupant is not applying make-up to an eye and moves to the processing in step S306, the CPU 30 determines whether or not the occupant is applying make-up to the mouth. Specifically, by using the functionality of the identification section 60, the CPU 30 performs the determination, based on a video shot by the camera 24.

When it is determined in step S306 that the occupant is applying make-up to the mouth, the CPU 30 moves to processing in step S307. When it is determined in step S306 that the occupant is not applying make-up to the mouth, the CPU 30 moves to processing in step S308.

In step S307, the CPU 30 determines whether or not the acceleration that is equal to or more than a second threshold value is predicted. Specifically, as shown in FIG. 13, it is determined whether or not the acceleration that is equal to or more than the threshold value B=B4 is predicted with respect to the road-surface acceleration. The threshold value B4 is assumed to be a larger value than the threshold value B3. Accordingly, a level of alert for a shake of the vehicle is lowered, compared to the case where the occupant applies make-up to an eye.

When it is determined in step S307 that the acceleration that is equal to or more than the second threshold value is predicted, the CPU 30 moves to processing in step S304. When it is determined in step S307 that the acceleration that is equal to or more than the second threshold value is not predicted, the CPU 30 terminates the processing.

In step S308, the CPU 30 determines whether or not the acceleration that is equal to or more than a third threshold value is predicted. Specifically, as shown in FIG. 13, it is determined whether or not the acceleration that is equal to or more than the threshold value B=B5 is predicted with respect to the road-surface acceleration. The threshold value B5 is assumed to be a further larger value than the threshold value B4. Accordingly, a level of alert for a shake of the vehicle is lowered, compared to the case where the occupant is applying make-up to the mouth.

As described above, according to the present embodiment, the predetermined value of acceleration used to determine whether or not the assistance information needs to be notified is changed according to a site to which the occupant applies make-up. Thus, assistance taking a shake of the vehicle into consideration can be rendered according to a site to which make-up is applied.

Specifically, when the occupant is applying make-up to an eye or the mouth, the predetermined value of acceleration is set to be smaller than when the occupant is applying make-up to another site such a cheek or the forehead. Accordingly, the assistance information can be notified even for a relatively small shake when the occupant is applying make-up to a site more easily affected by a shake of the vehicle, such as an eye or the mouth. Thus, assistance taking a shake of the vehicle into consideration can be rendered according to a site to which make-up is applied.

In the present embodiment, by using the functionality of the identification section 60, a make-up tool used by the occupant can be identified based on a video from the camera. The vehicle occupant assistance apparatus 10 identifies a site to which make-up is applied, based on a type of the make-up tool. Accordingly, false recognition is prevented in which both an action of simply rubbing an eye and an action of applying mascara to an eye are recognized as identical actions of applying make-up to an eye. Thus, a site to which make-up is applied can be accurately identified, and the appropriate assistance information can be notified.

As described above, according to the second embodiment, each threshold value is set according to a site to which the occupant is applying make-up, based on predicted values of an acceleration in a monoaxial direction (the vehicle-height direction). However, the present disclosure is not limited to such an embodiment. As in the modification example 2 of the first embodiment, each threshold value may be set with respect to the synthesized value of accelerations in a plurality of axial directions.

FIG. 15 shows, as an example, a scatter diagram with a vertical axis representing the road-surface acceleration A1 and a horizontal axis representing the steering acceleration A2, on which synthesized values of the accelerations in the two directions are mapped. In FIG. 15, the threshold values B=B6, B7, B8 are set according to cases where the occupant applies make-up to an eye, the mouth, and any other site, respectively. Referring to FIG. 15, it can be seen that a synthesized value a3 is a smaller value than any of the threshold values B (B6, B7, B8). Moreover, it can be seen that a synthesized value a4 is equal to or more than the threshold value B6 corresponding to make-up applied to an eye, and is less than the threshold values B7, B8 corresponding to make-up applied to the mouth and any other site. Accordingly, when synthesized acceleration corresponding to the synthesized value a4 is predicted when the occupant is applying make-up to an eye, the notification section 62 notifies the assistance information.

SUPPLEMENTARY EXPLANATION

In the embodiments and the modification examples, a configuration is made such that the make-up mode is activated based on a video shot by the camera 24, or on whether the cover part 27A of the mirror part 27 provided on the sun visor 26 is opened or closed. However, the present disclosure is not limited to such a configuration. For example, a configuration may be made such that the make-up mode is activated by an occupant performing a predetermined operation on an operation section of the vehicle. Alternatively, a configuration may be made such that with provision of a display device that displays a mirror image of the whole face of an occupant by using a video shot by the camera in the vehicle cabin, the make-up is activated when the display device starts.

In the embodiments and the modification examples, the assistance information is configured by using the alarm tone. However, the present disclosure is not limited to such a configuration. A notification form of the assistance information can be changed as appropriate. For example, the assistance information may be a voice message and may directly notify a specific shake of the vehicle or an action requested of an occupant, such as "the vehicle will shake", "the vehicle will shake sideways", or "please suspend make-up". A configuration may be made such that the assistance information is displayed in a form of text information on a display provided in the vehicle cabin. The assistance information may be notified by being output to a ramp or the like provided in the vehicle cabin.

The make-up assistance processing and the notification processing, which is executed by the CPU reading the software (program) in each of the embodiments, may be executed by any of various types of processors other than the CPU. Examples of such processors include a PLD (Programmable Logic Device) such as an FPGA (Field-Programmable Gate Array), a circuit configuration of which can be changed after manufactured, and a dedicated electric circuit such as an ASIC (Application Specific Integrated Circuit), which is a processor having a circuit configuration exclusively designed to execute specific processing. The make-up assistance processing and the notification processing may be executed by one of such various types of processors, or may be executed by a combination of two or more processors of the same type or different types (for example, a plurality of FPGAs, a combination of a CPU and an FPGA, or the like). A hardware structure of such various types of processors is, more specifically, an electric circuit configured by combining circuit elements such as semiconductor devices. In each of the embodiments, a form is described in which the programs for the make-up assistance processing and the notification processing are stored (installed) beforehand in the ROM or the storage. However, the present disclosure is not limited to such a form, and the programs may be provided in a form in which the programs are recorded in a recording medium such as a CD-ROM (Compact Disk Read Only Memory), a DVD-ROM (Digital Versatile Disk Read Only Memory), or a USB (Universal Serial Bus) memory. A form may be adopted in which the programs are downloaded from an external apparatus via a network.

What is claimed is:

1. A vehicle occupant assistance apparatus for a vehicle, comprising:
    an automatic driving control section that causes the vehicle to travel by automatic driving, based on a route and operation plan;
    an activation section that
        activates, during the automatic driving, a make-up mode in which an occupant is assisted in applying make-up to the occupant, and
        terminates the make-up mode in response to the automatic driving being finished;
    an acceleration prediction section that predicts acceleration occurring when the vehicle is traveling by the automatic driving, based on the route and operation plan;
    an identification section configured to, in a state where the make-up mode is activated during the automatic driving, identify a site to which the occupant applies make-up; and
    a notification section that, in the state where the make-up mode is activated during the automatic driving, notifies of assistance information for assisting the occupant in applying make-up before a predetermined value of the acceleration occurs, based on predicted values of the acceleration, wherein
    the activation section activates the make-up mode when a cover part of a mirror part on a sun visor provided in a vehicle cabin is opened,
    the notification section is configured to change the predetermined value of the acceleration, according to the site identified, wherein
        in response to the site to which the occupant applies make-up being identified as an eye, the notification section is configured to set the predetermined value to a first predetermined value, and
        in response to the site to which the occupant applies make-up being identified as a mouth, the notification section is configured to set the predetermined value to a second predetermined value, wherein the first predetermined value is smaller than the second predetermined value,
    the acceleration prediction section predicts accelerations in a plurality of directions occurring when the vehicle is traveling by the automatic driving, and
    in the state where the make-up mode is activated during the automatic driving, the notification section notifies the occupant of, among the plurality of directions, a direction in which the vehicle will shake, in response to the acceleration predicted in said direction exceeding a corresponding threshold.

2. The vehicle occupant assistance apparatus according to claim 1, wherein the predetermined value of the acceleration is equal to or more than a first threshold value.

3. The vehicle occupant assistance apparatus according to claim 2, wherein the predetermined value of the acceleration is a value of integral equal to or more than a second threshold value, the value of integral being within a predetermined time period for which the acceleration that is equal to or more than the first threshold value occurs.

4. The vehicle occupant assistance apparatus according to claim 1, wherein:
    the predetermined value of the acceleration is a synthesized value of accelerations that is equal to or more than a third threshold value, the synthesized value of accelerations being obtained by synthesizing accelerations in two or more directions among the accelerations in the plurality of directions.

5. The vehicle occupant assistance apparatus according to claim 4, wherein the accelerations in the two or more directions are accelerations in three axial directions occurring when the vehicle is traveling, the three axial directions being directions along a vehicle-height direction, a vehicle front-rear direction, and a vehicle-width direction.

6. The vehicle occupant assistance apparatus according to claim 1, wherein the notification section is configured to, in response to the site to which the occupant applies make-up being identified as other than the eye and the mouth, set the predetermined value to a third predetermined value greater than the first and second predetermined values.

7. The vehicle occupant assistance apparatus according to claim 1, wherein
    the identification section configured to
        identify a make-up tool used by the occupant, based on a video from a camera that shoots an image of the occupant in the vehicle cabin, and
        identify the site to which the occupant applies make-up, based on a type of the make-up tool.

8. The vehicle occupant assistance apparatus according to claim 1, further comprising:
    a route and operation plan configuration section configured to configure the route and operation plan for the vehicle, based on surroundings information or map information.

9. The vehicle occupant assistance apparatus according to claim 8, wherein
    the direction in which the vehicle will shake is a vehicle-height direction of the vehicle, and
    the acceleration prediction section predicts the acceleration in the vehicle-height direction based on information related to road roughness included in the map information.

10. The vehicle occupant assistance apparatus according to claim 1, wherein
    in a coordinate system comprising a first axis corresponding to a first direction among the plurality of directions, and a second axis corresponding to a second direction among the plurality of directions,
        the first predetermined value is on a first two-dimensional line intersecting the first and second axes correspondingly at first and second values, and
        the second predetermined value is on a second two-dimensional line intersecting the first and second axes correspondingly at third and fourth values, the third value greater than the first value, the fourth value greater than the second value.

* * * * *